UNITED STATES PATENT OFFICE.

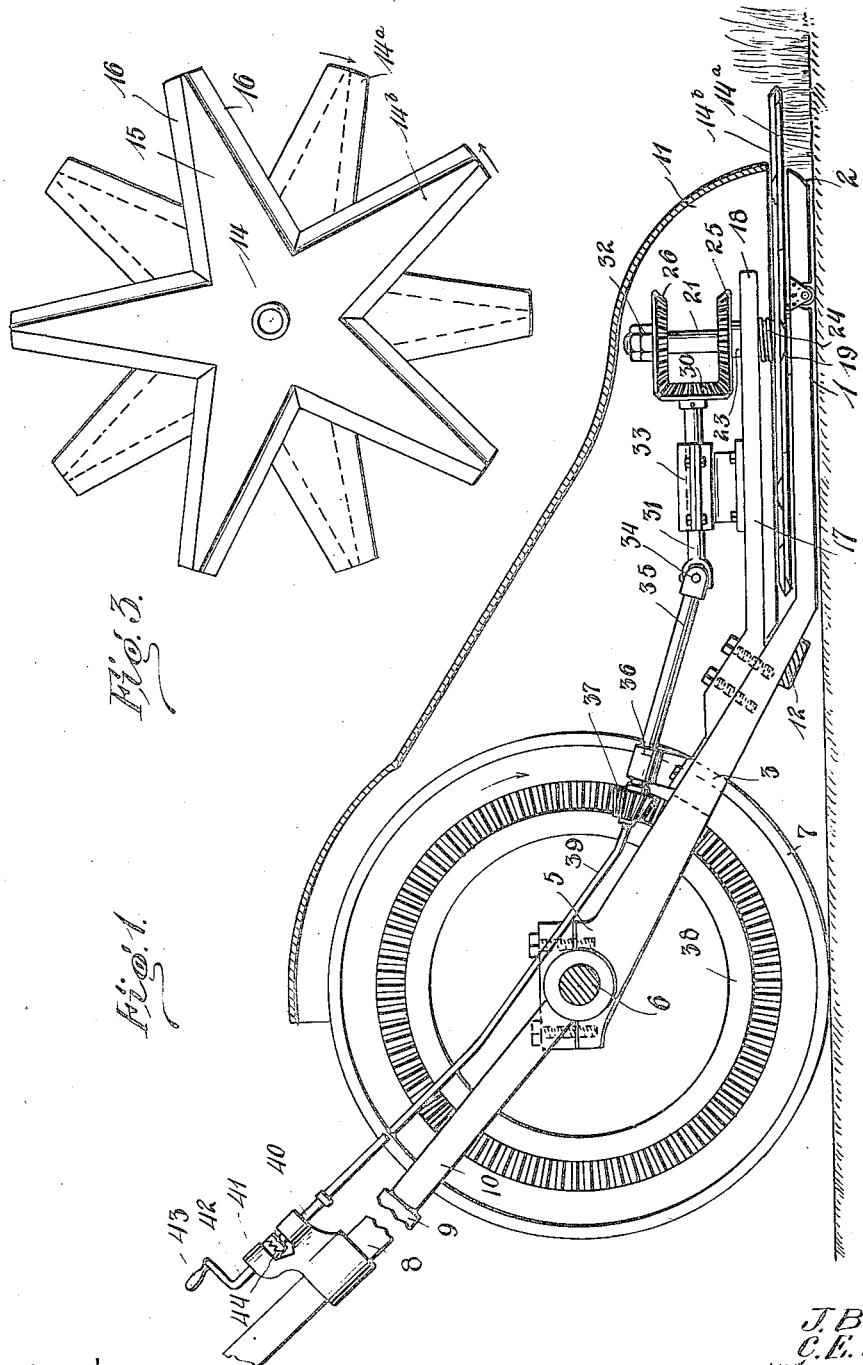

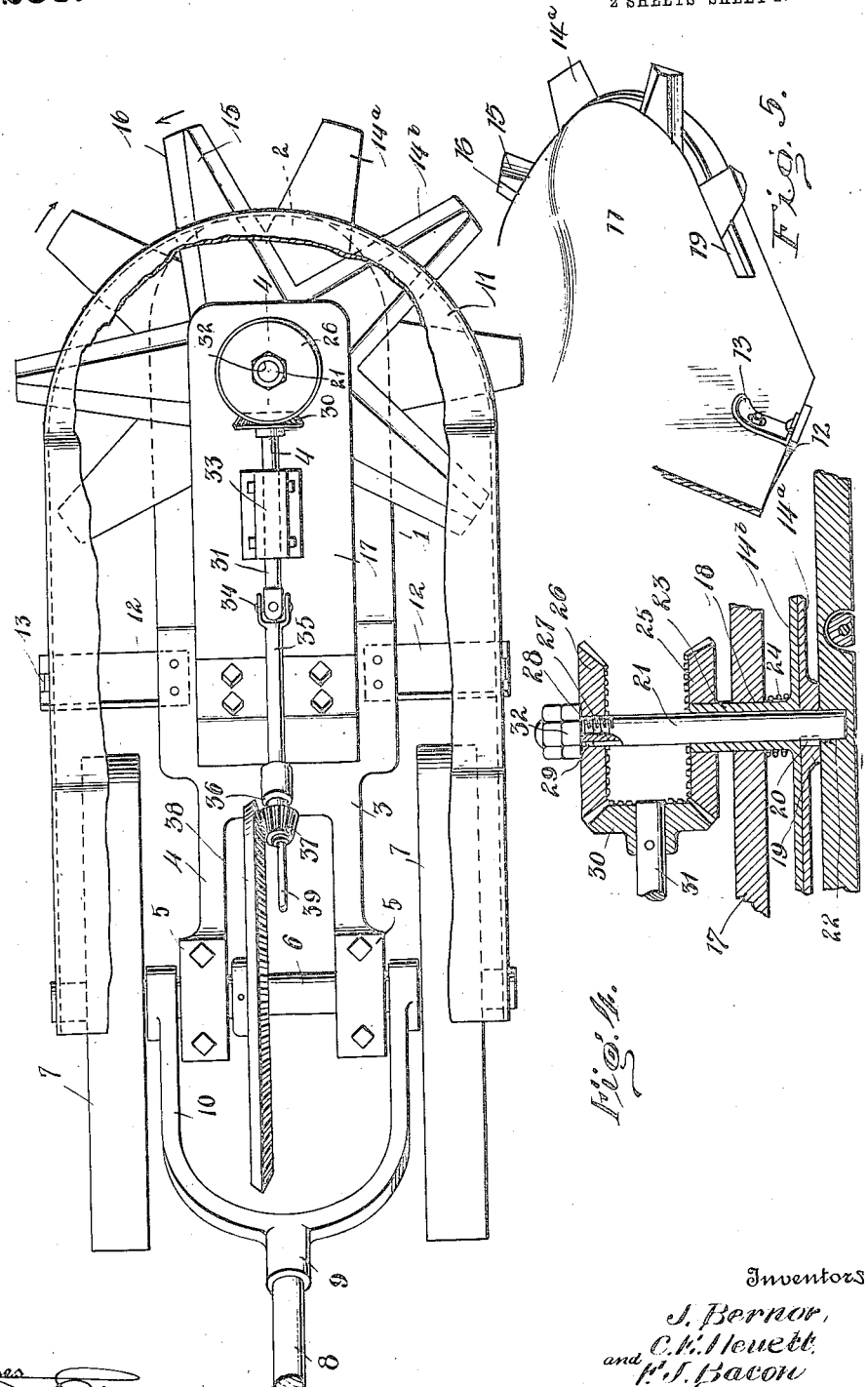

CHARLES E. HEWETT, JOHN BERNOR, AND FREDERICK J. BACON, OF FORESTDALE, VERMONT.

LAWN-MOWER.

1,130,283.  Specification of Letters Patent.  Patented Mar. 2, 1915.

Application filed September 23, 1913. Serial No. 791,392.

*To all whom it may concern:*

Be it known that we, CHARLES E. HEWETT, JOHN BERNOR, and FREDERICK J. BACON, citizens of the United States, residing at Forestdale, in the county of Rutland and State of Vermont, have invented certain new and useful Improvements in Lawn-Mowers, of which the following is a specification.

This invention relates to lawn mowers and has for its object to provide a mower which may be successfully used in close proximity to walls, fences, trees and shrubbery, and the like and which will be adapted to cut grass and weeds regardless of the height to which they have grown.

Another object of the invention is to provide a mower so constructed that under ordinary conditions its cutting blades or knives will be actuated through the medium of ground wheels and suitable gearing, means being provided whereby the knives may be manually actuated when it is desired to cut grass or weeds standing in a corner or in an angle between walls, and in other places where it is impractical to give to the mower a forward motion with sufficient force or momentum to cause the necessary rapid rotation or actuation of the cutting devices.

Another feature of the invention resides in the provision of means for, at all times, holding the cutting elements of the mower in firm contact so as to insure of proper coöperation of their cutting edges.

Another aim of the invention is to provide a mower so constructed that it will not be necessary to repeatedly move the same back and forth over a relatively small area to be cleared in order to cut all of the stands of grass or weeds, as is necessary in the use of the ordinary type of lawn mower.

In the accompanying drawings: Figure 1 is a view partly in section and partly in elevation of a lawn mower constructed in accordance with the present invention; Fig. 2 is a top plan view of the mower, the hood being partly broken away; Fig. 3 is a plan view of the cutting devices of the mower; Fig. 4 is a vertical sectional view on the line 4—4 of Fig. 2. Fig. 5 is a detail view of a latch which may be employed to retain the hood in position.

Corresponding and like parts are referred to in the following description and indicated in all the views of the drawings by the same reference characters.

In the drawings, the mower is illustrated as including a shoe or runner 1 which is preferably flat upon its upper side, as clearly shown in Fig. 1 of the drawings and has its under side at its forward end curved or beveled as at 2 so that the shoe may readily pass over inequalities in the ground surface. A frame, indicated in general by the numeral 3, is preferably integral with and extends rearwardly from the shoe 1 and includes side portions 4 which are inclined upwardly and rearwardly and which are provided at their upper ends with bearings 5 in which the supporting axle of the mower, indicated at 6, is journaled. The axle 6 is supported at its ends by ground wheels 7 which, upon forward rotation, serve to impart a like movement to the axle 6. In order that the mower may be impelled forwardly, a handle bar 8 is provided which, at its forward end, is fitted in a socket 9 at the rear side of a yoke frame 10, the forward ends of the sides of which pivotally fit the axle 6 in the manner shown in Fig. 2.

The cutting devices shown in Fig. 3 are mounted above the shoe 1 in a manner which will be presently explained and are driven through the medium of suitable gearing actuated either through the medium of the axle 6 or manually as occasion may require, and in order that the cutting elements and gearing driving the same may be protected and prevented from becoming fouled by the cut grass and weeds, a hood is provided which is indicated in general by the numeral 11 and which has its sides pivotally connected with the extremities of the axle 6 and resting at their lower edges upon supporting bracket plates 12 which extend laterally from the forward end of the frame 3. The hood 11 is normally held in position, to protect the parts, as stated, by means of suitable latch devices 13 which may be of any desired construction and which are preferably located upon the ends of the bracket plates 12 and coöperate with keepers upon the sides of the hood, it being understood that when it is desired to gain access to the gearing or to the cutting devices, the hood may be swung upwardly upon the axle as a pivot after the latch devices have been released or rendered inoperative.

Each of the cutting embers, shown in Fig. 3 of the drawings, consists of a head 14 having a series of radially projecting blades 15 provided with cutting edges 16 which converge in the direction of the outer ends of the blades. Two of the members are preferably employed, they being disposed face to face and mounted for rotation in opposite directions in a manner to be presently pointed out. It will be apparent, by reference to Fig. 3 and to the arrows therein indicating the direction of rotation of the two members, that the blades of the said members are designed to have shearing coöperation.

A bracket member 17 is secured at one end to the frame 3 and extends above and parallel to the shoe 1 and this bracket member, at its forward end, is formed with a bearing opening 18. The under one of the cutting members shown in Fig. 3 and indicated in Fig. 4 specifically by the reference numeral 14ª, has its hub portion 19 keyed or otherwise secured as at 20 to the lower end of a shaft 21 journaled in a step bearing 22 in the upper side of the shoe 1. The other one of the cutting members, indicated specifically in said figure by the reference character 14ᵇ, is provided with an upwardly projecting sleeve portion 23 which is slidably fitted in the bearing opening 18 in the bracket member 17. A spring 24 is fitted upon the sleeve member 23 and at its upper end bears against the under side of the bracket member 17 and at its lower end against the upper side of the cutting member 14ᵇ and this spring serves to yieldably, but firmly, hold the member 14ᵇ in contact with the member 14ª so that proper coöperation of the blades 15, as they are rotated in opposite directions, will be provided for.

A bevel gear 25 is keyed or otherwise secured to the upper end of the sleeve portion 23 as clearly shown in Fig. 4 and a similar gear 26 is mounted upon the upper end of the shaft 21. The shaft 21 is formed with a keyway 27 and its upper portion is threaded as at 28. The shaft opening in the gear 26 is provided upon its wall with an integral key or short rib 29 which projects into the keyway 27 and serves to connect the gear 26 for rotation with the shaft 21 although permitting of vertical adjustment of the gear upon the shaft.

A bevel gear 30 is fixed upon the forward end of a shaft 31 and meshes with the gears 25 and 26, it serving in its rotative movement, to rotate the gears and the shafts upon which they are mounted, in opposite directions. It will now be apparent that the blades 15 project beyond the forward side of the mower both at the front and sides of the hood and that the said cutting members are to be rotated in opposite directions upon rotation of the shaft 31. In order that the gear 26 may be held firmly in mesh with the gear 30 and that the cutting member 14ª may be held firmly against the under side of the member 14ᵇ, a nut 32 is threaded upon the upper end of the shaft 21 and may be tightened so as to bear down upon the gear 26 and consequently pull up upon the shaft 21 for the purpose stated.

The shaft 31 is mounted in a suitable bearing 33 upon the bracket member 17 and is connected by a knuckle joint 34 with a shaft 35 mounted in a bearing 36 upon the frame 3. At the rear end of the shaft 35, is a bevel pinion 37 meshing with a bevel gear 38 fixed upon the axle 6, it being understood that the forward rotation of the axle 6 will result in rotative movement being transmitted to the shaft 31.

In order that the shaft 35 may be rotated manually, as for example, when it is desired to cut the grass or weeds standing in a corner or angle between walls or in other places where it would be impractical to employ the ordinary mower or the mower embodying the present invention by reason of the fact that sufficient momentum could not be given it to secure the desired rapid rotation of the cutting members, a flexible shaft 39 is provided. The front end of this shaft is operatively connected to the rear end of the shaft 35 and to the gear 37 in any convenient or preferred manner as by being made angular and engaging in an angular socket in the shaft or the pinion. The rear end of said shaft 39 is connected to a relatively short shaft 40 mounted for rotation in a bracket 41 upon the handle 8. A shaft 42, also journaled in the bracket 41, is provided with a crank handle 43, whereby it may be rotated and it is preferable that a clutch device of any suitable type, indicated at 44, be provided for connecting for rotation the shafts 40 and 41. As the shaft 39 is flexible to adapt it to the relative inclinations of the frame and the shaft 35, it may be readily sprung to one side so as to disengage the pinion 37 from the gear 38 or, if the device be slightly tilted upon the front end of the shoe 2, the disengagement of the pinion 37 and the gear 38 will be unnecessary. In actually constructing the device, sufficient play will be provided in the bearing 36 to hold the pinion 37 to the gear 38 but permit it to be readily shifted when desired.

The pinion 37 may be mounted in any convenient manner which will readily suggest itself to the skilled mechanic in order to permit the manual operation of the shafts 39 and 35 without effecting rotation of the axle and the gear wheel, as by employing a ratchet connection or escapement which will permit rotation of the gear about the shaft in one direction without rotating the shaft while movement of the gear in the opposite direction will effect rotation of the shaft and if the shaft be driven otherwise than through the gear it will rotate freely in the gear without actuating the same.

It is desirable that the shoe 1 be supported by a roller, such as indicated at 45, although it will of course be understood that, if desired, this roller may be dispensed with.

Having thus described the invention, what is claimed as new:

1. In a mower, the combination of a downwardly and forwardly inclined frame, a shoe carried by the lower end of the frame and adapted to run on the ground in advance of the same, a bracket secured to the frame near the lower end thereof and projecting forwardly therefrom over the shoe, a vertical shaft extending through the bracket near the front end of the same and having its lower end journaled in the shoe, a cutter carried by said shaft immediately above the shoe and extending beyond the same, a hollow shaft journaled in the bracket and fitted around the first mentioned shaft, a cutter carried by the lower end of the hollow shaft and bearing upon the first mentioned cutter, a spring arranged between the bracket and the second mentioned cutter and bearing against said cutter to hold it to the first mentioned cutter, opposed beveled gears on the upper ends of said shafts, a bearing on the upper side of the bracket in rear of the shafts, a horizontal shaft journaled in said bearing, a beveled gear on the front end of said shaft meshing with the opposed beveled gears, and means on the frame connected with the rear end of the horizontal shaft to rotate the same.

2. In a mower, a frame consisting of downwardly and forwardly inclined spaced side bars, an axle mounted in the upper rear end of the frame, ground wheels mounted upon the axle and supporting the said frame for travel, the frame being of a width less than the distance between the wheels and having laterally projecting bracket portions at its lower front end, a shoe extending forwardly from the lower end of the frame and also of a width less than the distance between the wheels, a rotary cutting member supported upon the shoe and having cutting portions projecting laterally and forwardly beyond the shoe, means for rotating the said member, a hood pivotally supported at the rear upon the axle and resting upon the laterally projecting bracket portions and extending over the frame and shoe and covering a portion of the cutting member and the actuating mechanism therefor, and retaining means on said laterally projecting bracket portions engaging the hood.

3. A mower comprising a frame consisting of downwardly and forwardly inclined spaced side bars, a shoe extending forwardly from the lower end of the frame, an axle journaled upon the upper end of the frame, carrying-wheels on said axle mounted laterally beyond the frame, a yoke pivoted on the axle, a handle bar extending rearwardly from the yoke, a bracket projecting forwardly from the frame above and parallel with the shoe, oppositely rotating cutters arranged between said bracket and the shoe, a flexible shaft mounted longitudinally upon the bracket, the frame and the handle bar, gearing connecting the front end of said shaft with the cutters, means at the rear end of said shaft for manually rotating the same, a pinion on said shaft at an intermediate point of its length, and a gear on the axle between the said bars of the frame meshing with said pinion, said pinion being adapted to be at times disengaged from the said gear.

In testimony whereof we affix our signatures in presence of two witnesses.

CHARLES E. HEWETT. [L. S.]
JOHN BERNOR. [L. S.]
FREDERICK J. BACON. [L. S.]

Witnesses:
William H. Dean, Jr.
Frank W. Williams.